US011065634B1

(12) United States Patent
Hernandez et al.

(10) Patent No.: US 11,065,634 B1
(45) Date of Patent: Jul. 20, 2021

(54) CELLPHONE CASE THAT DISPENSES PERFUME

(71) Applicants: Elvin Hernandez, Miami, FL (US); Ronaldys Gouthman, Hialeah, FL (US)

(72) Inventors: Elvin Hernandez, Miami, FL (US); Ronaldys Gouthman, Hialeah, FL (US)

(*) Notice: Subject to any disclaimer, the term of this patent is extended or adjusted under 35 U.S.C. 154(b) by 0 days.

(21) Appl. No.: 17/213,446

(22) Filed: Mar. 26, 2021

(51) Int. Cl.
*B05B 11/00* (2006.01)
*B05B 7/24* (2006.01)
*H04B 1/3888* (2015.01)

(52) U.S. Cl.
CPC ........ *B05B 11/3011* (2013.01); *B05B 7/2408* (2013.01); *B05B 11/0056* (2013.01); *H04B 1/3888* (2013.01)

(58) Field of Classification Search
CPC .............. B05B 11/3011; B05B 7/2408; B05B 11/0056; H04B 1/3888
USPC ...................................................... 455/575.8
See application file for complete search history.

(56) References Cited

U.S. PATENT DOCUMENTS

| | | | | |
|---|---|---|---|---|
| 5,429,301 A * | 7/1995 | Franks | ................. | B65D 83/384 222/145.1 |
| 5,476,192 A * | 12/1995 | Julinot | ................. | B65D 83/384 116/81 |
| 5,683,012 A * | 11/1997 | Villaveces | ................. | A45F 5/02 222/175 |
| 8,639,288 B1 * | 1/2014 | Friedman | ............... | G16H 20/17 455/556.1 |
| 8,976,031 B2 * | 3/2015 | Ophardt | ................. | G16H 40/20 340/573.1 |
| 9,700,674 B2 * | 7/2017 | Despa | .................. | A61B 5/4839 |
| 9,806,549 B2 * | 10/2017 | Liberti | .................... | A24F 40/95 |
| 9,874,899 B2 * | 1/2018 | Oliveira | ................ | G06F 1/1626 |
| 10,634,460 B1 * | 4/2020 | Sheikh | ................. | H04B 1/3888 |
| 2004/0235430 A1 * | 11/2004 | Ma | ............................ | A61L 9/12 455/90.1 |
| 2006/0201964 A1 * | 9/2006 | DiPerna | ..................... | F41H 9/10 222/78 |
| 2008/0020794 A1 * | 1/2008 | Garon | ............... | A61B 5/150022 455/556.1 |
| 2011/0005606 A1 * | 1/2011 | Bartels | .................. | F04B 43/046 137/14 |
| 2017/0173616 A1 * | 6/2017 | Rocca | ..................... | F41F 3/045 |
| 2019/0310049 A1 * | 10/2019 | Stilson | ...................... | F41H 9/10 |

* cited by examiner

*Primary Examiner* — Vishal Pancholi
(74) *Attorney, Agent, or Firm* — Ruben Alcoba, Esq.

(57) ABSTRACT

A cellphone case that dispenses perfume. The cellphone case defines a flat fluid reservoir that holds perfume. The flat fluid reservoir defines an atomizer nozzle that lines up with a nozzle aperture of the cellphone case, a push button activator that lines up with a trigger aperture of the cellphone case, and a refill inlet valve that lines up with a refill aperture of the cellphone case.

3 Claims, 3 Drawing Sheets

CELLPHONE CASE THAT DISPENSES PERFUME

TECHNICAL FIELD

The present invention pertains to a cellphone case that dispenses perfume.

BACKGROUND

The present invention is designed to allow a person who carries a cellphone with the ability to have a perfume dispenser within a cellphone case that protects the cellphone.

The invention eliminates the need of having to carry a separate perfume/cologne dispenser if one wishes to have a pleasant smell throughout the course of a day.

The inventor of the present invention enjoys having a pleasant smell throughout the course of a day. Yet, sometimes he was not able to keep the pleasant smell throughout the day, for it was impractical to carry a perfume dispenser throughout the day.

He realized that one thing that he always had to carry with him throughout the day was a cellphone and that most cellphones are covered with a cellphone case.

The above realization led him to conceive placing a reservoir with the cellphone case so that he could store a perfume within the reservoir. He realized that the cellphone case had to be designed to allow the perfume to be dispensed from the cellphone case. He also realized that the reservoir had to have the capacity of being refilled.

The present invention resolves the need of having to carry a separate perfume dispenser if one wishes to have a pleasant smell throughout the course of a day by providing a cellphone case that dispenses perfume.

SUMMARY

The present invention is directed to a cellphone case that dispenses perfume.

The cellphone case is comprised of a flat fluid reservoir that holds perfume. The flat fluid reservoir defines an atomizer nozzle that lines up with a nozzle aperture of the cellphone case, a push button activator that lines up with a trigger aperture of the cellphone case, and a refill inlet valve that lines up with a refill aperture of the cellphone case.

The flat fluid reservoir is pressure filled with perfume via the refill inlet valve.

In a preferred embodiment of the present invention, the cellphone case defines a vertical linear aperture that allows a user to see if the flat fluid reservoir has perfume within the flat fluid reservoir and the flat fluid reservoir is made of a transparent material.

An object of the present invention is to provide a cellphone case that dispenses perfume.

Another object of the present invention is to provide a cellphone case that dispenses perfume that is refillable.

DRAWINGS

These and other features, aspects, and advantages of the present invention will become better understood with regards to the following description, appended claims, and drawings where:

DESCRIPTION

Figure 1:
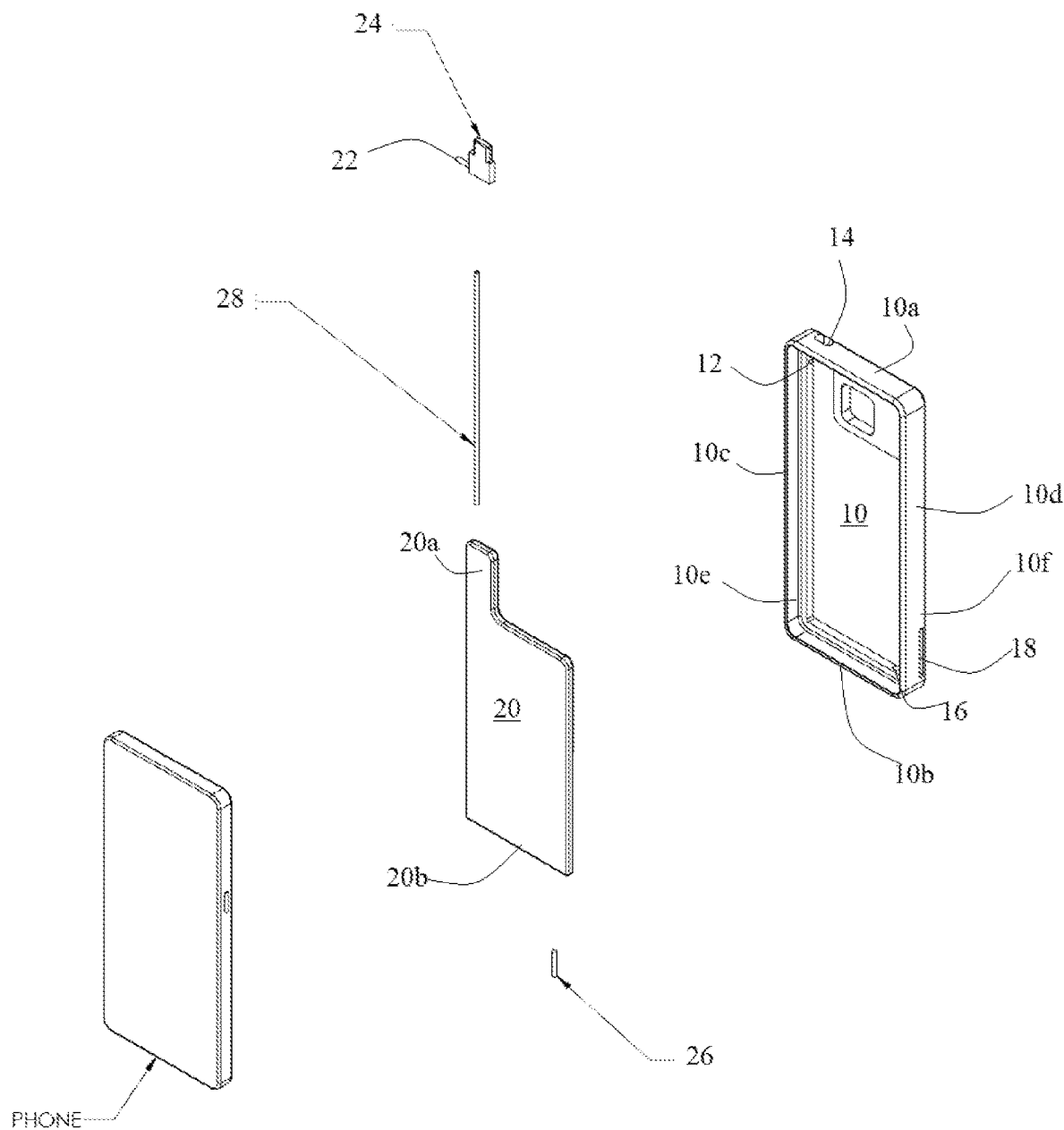
FIG. 1 is a perspective exploded view of an embodiment of the present invention that shows a left nozzle assembly.
Figure 2:
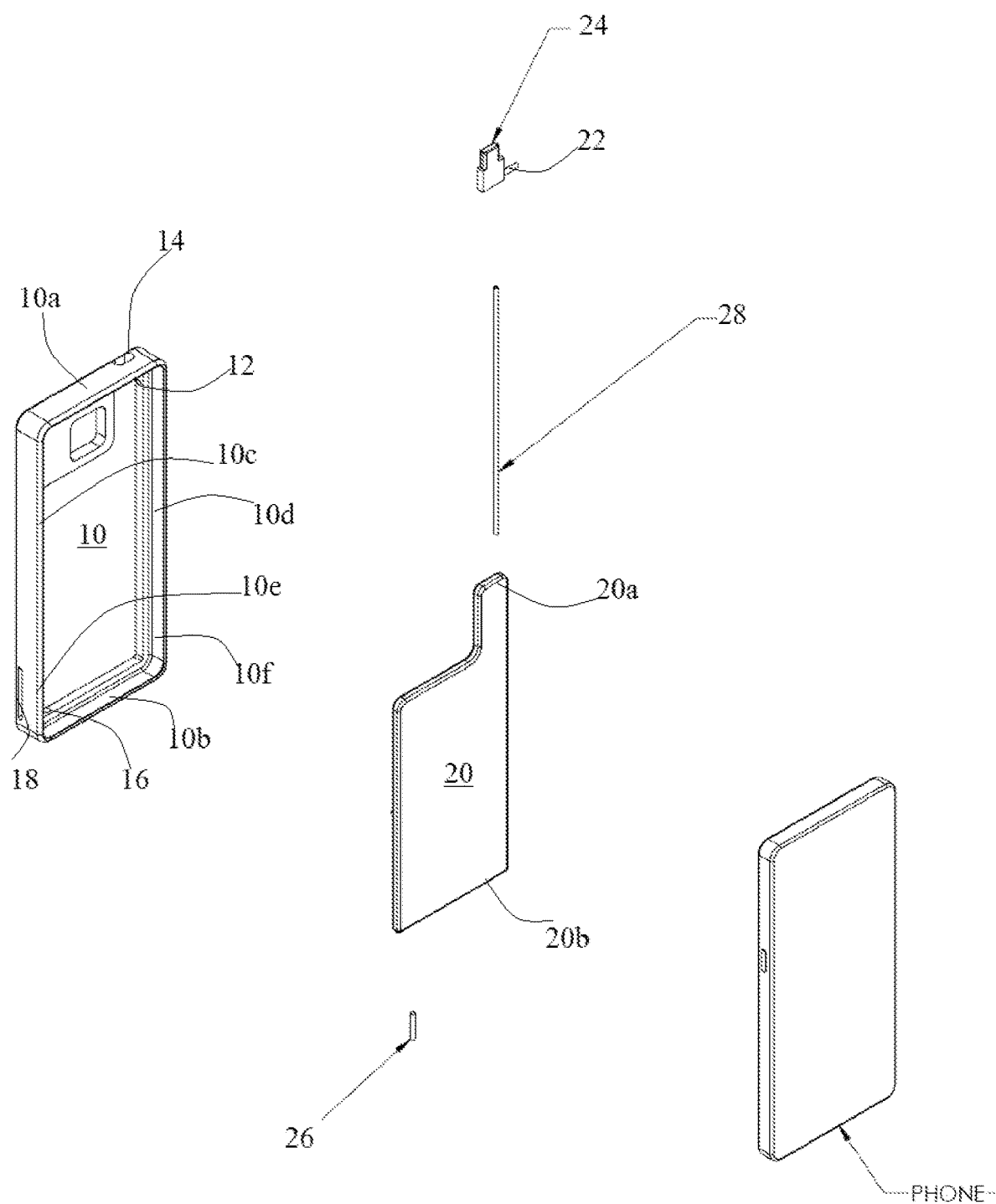
FIG. 2 is a perspective exploded view of the embodiment shown in FIG. 1.
Figure 3:
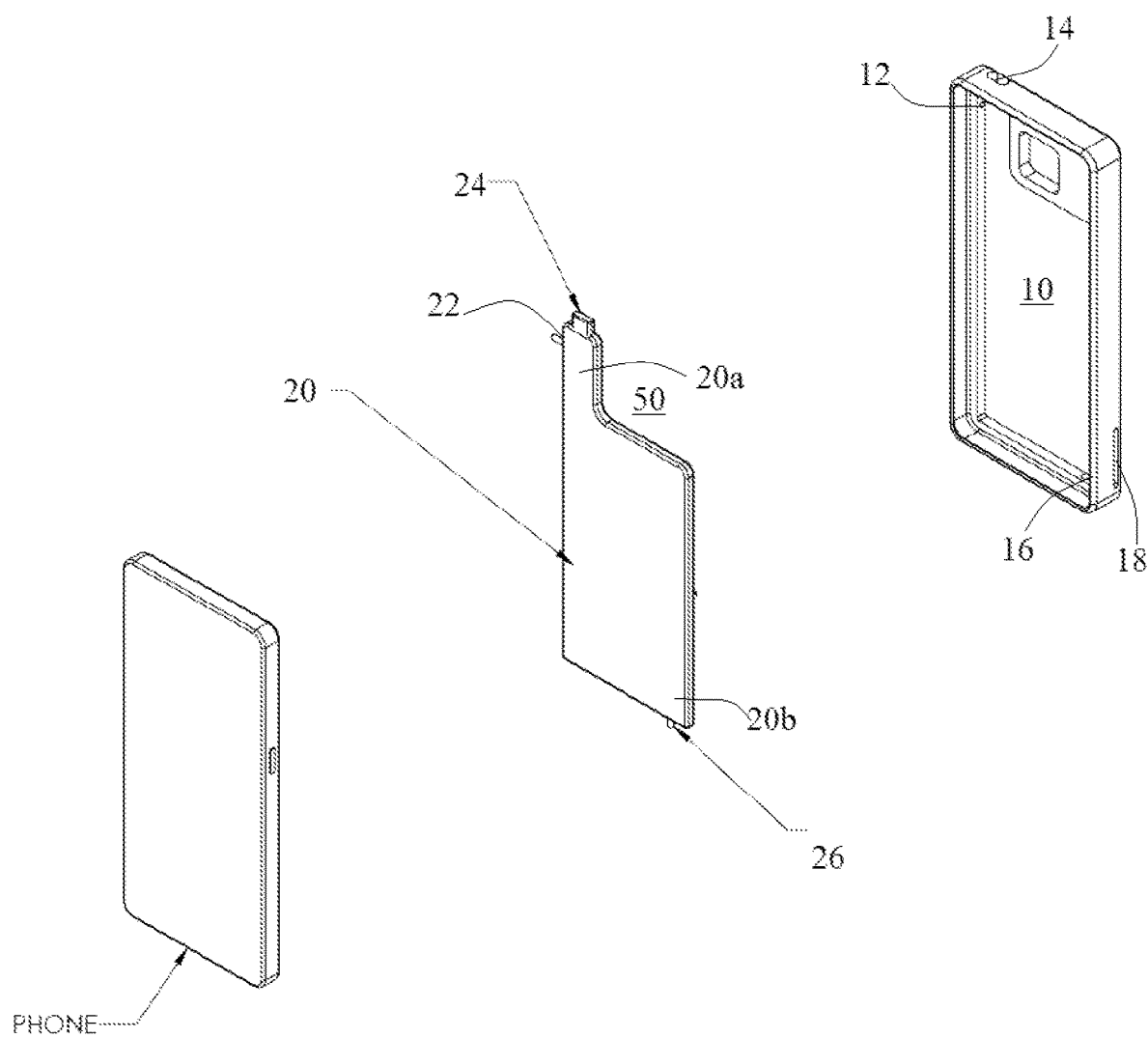
FIG. 3 is a perspective exploded view of another embodiment of present invention that shows a right nozzle assembly.

Referring to FIGS. 1-3, the present invention is a cellphone case that dispenses perfume.

The cellphone case that dispenses perfume comprises of a cellphone case 10 that has an upper wall 10a, a lower wall 10b, a left wall 10c, and a right wall 10d, a nozzle aperture 12 that is defined in either the left wall 10c or the right wall 10d, a trigger aperture 14 that is defined in the upper wall 10a, and a refill aperture 16 that is defined in the lower wall 10b. And, a flat fluid reservoir 20 that houses in an upper part 20a of the flat fluid reservoir 20 an atomizer nozzle 22 and a push button activator 24 that activates the release of a fluid from the flat fluid reservoir 20, and a refill inlet valve 26 that is defined on a lower section 20b of the fluid reservoir 20, the flat fluid reservoir 20 is attached to the cellphone case 10 so that the atomizer nozzle 22 lines up with the nozzle aperture 12, the push button activator 24 lines up with the trigger aperture 14, and the refill inlet valve 26 lines up with the refill aperture 16. The flat fluid reservoir 20 is an integral single piece body. The flat fluid reservoir 20 defines a rectangular space 50 at a location of the flat fluid reservoir 20 that is adjacent to the upper part 20a of to the flat fluid reservoir 20, the rectangular space 50 is configured to line up with a camera lens of a camera that is to be placed within the cellphone case 10.

In an embodiment of the present invention, the cellphone case 10 further comprises of a tube 28 that is within the fluid reservoir 20 that attaches to the atomizer nozzle 22.

In a preferred embodiment of the present invention, the cellphone case defines a linear vertical aperture 18 on either a left lower section 10e of the left wall 10c or a right lower section 10f of the right wall 10d and wherein the flat fluid reservoir 20 is made of a transparent material.

An advantage of the present invention is that it provides a cellphone case that dispenses perfume.

Another advantage of the present invention is that it provides a cellphone case that dispenses perfume that is refillable.

The embodiments of the cellphone case that dispenses perfume described herein are exemplary and numerous modifications, combinations, variations, and rearrangements can be readily envisioned to achieve an equivalent result, all of which are intended to be embraced within the scope of the appended claims. Further, nothing in the above-provided discussions of the cellphone case that dispenses perfume should be construed as limiting the invention to an embodiment or a combination of embodiments. The scope of the invention is defined by the drawings, the written description, and the appended claims.

What is claimed is:

1. A cellphone case that dispenses perfume, the cellphone case comprises of:

a cellphone case that has an upper wall, a lower wall, a left wall, and a right wall, a nozzle aperture that is defined in either the left wall or the right wall, a trigger aperture that is defined in the upper wall, and a refill aperture that is defined in the lower wall; and a flat fluid reservoir that houses in an upper part of the flat fluid reservoir an atomizer nozzle and a push button activator that activates the release of a fluid from the flat fluid reservoir, and a refill inlet valve that is defined on a lower section of the fluid reservoir, the flat fluid reservoir is attached to the cellphone case so that the atomizer nozzle lines up with the nozzle aperture, the push button activator lines up with the trigger aperture, and the refill inlet valve lines up with the refill aperture, the flat fluid reservoir is an integral single piece body.

2. The cellphone case that dispenses perfume of claim 1, the cellphone case comprises of a tube that is within the flat fluid reservoir that attaches to the atomizer nozzle.

3. The cellphone case that dispenses perfume of claim 2, wherein the cellphone case defines a linear vertical aperture on either a left lower section of the left wall or a right lower section of the right wall and wherein the flat fluid reservoir is made of a transparent material.

* * * * *